Wilson. Green & Wilson Jr.

Powder Keg.

No. 3757. Reissued Dec. 7. 1869.

Witnesses
E. J. Dupont
S. Dupont
Eugene Dupont

Chas. Green
Chas. Wilson Jr.
Henry Dupont
by Wm. Wilson
Atty.

Witnesses
M. Bailey
Wm. H. Bailey

United States Patent Office.

CHARLES GREEN, WILLIAM WILSON, JR., HENRY DU PONT, E. I. DU PONT, L. DU PONT, AND EUGENE DU PONT, OF WILMINGTON, DELAWARE, AND CHARLES PRATT, OF NEW YORK, N. Y., ASSIGNEES OF JAMES WILSON, CHARLES GREEN, AND WILLIAM WILSON, JR.

*Letters Patent No.* 24,772, *dated July* 12, 1859; *reissue No.* 1,383, *dated January* 6, 1863; *reissue No.* 3,757, *dated December* 7, 1869.

IMPROVEMENT IN POWDER-KEGS.

The Schedule referred to in these Letters Patent and making part of the same

*To whom it may concern:*

Be it known that we, JAMES WILSON, CHARLES GREEN, and WILLIAM WILSON, Jr., of Wilmington, in the county of New Castle, and State of Delaware, have invented certain new and useful Improvements in Powder-Kegs and other sheet-metal cans; and we hereby declare the following to be a full, clear, and exact description of the same, reference being had to the accompanying drawings, in which—

Figure 1:
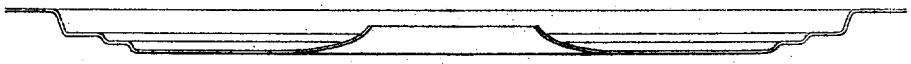
Figure 2:
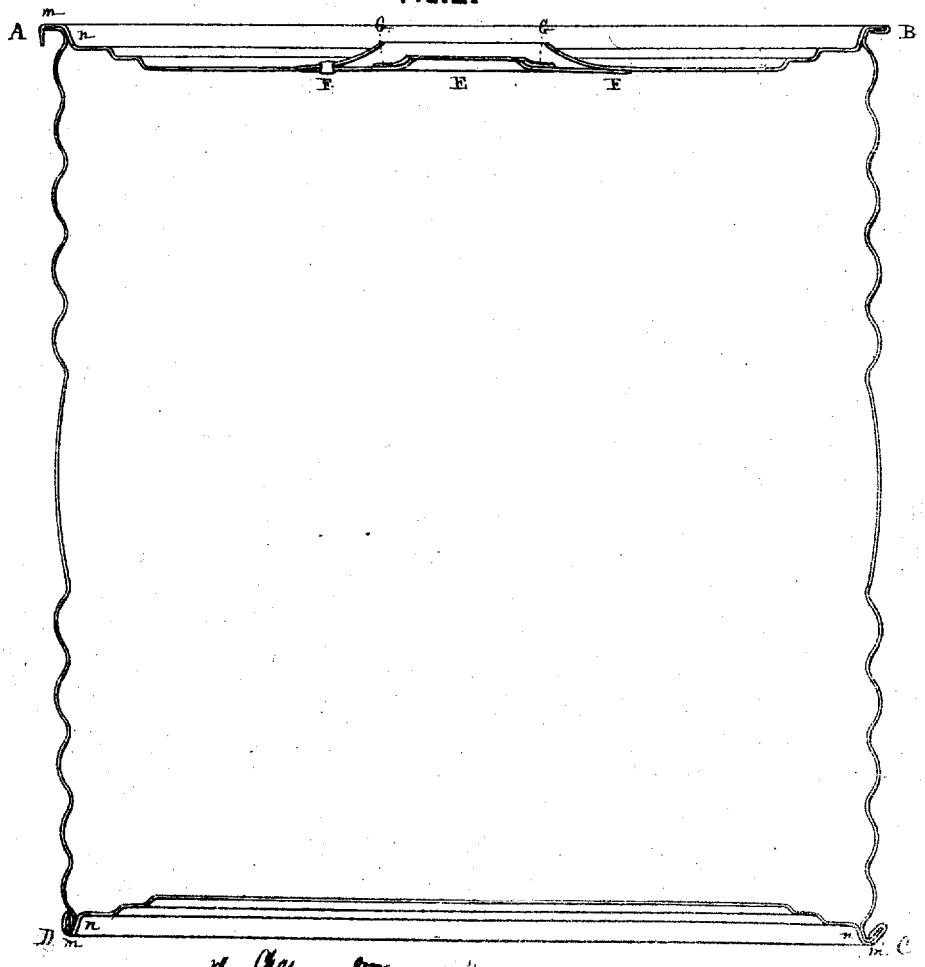

Figure 1 represents the head of the sheet-metal can as constructed in accordance with our invention, and Figure 2 represents the position of the head when applied and attached to the can.

Our invention consists—

First, in the method of closing sheet-metal cans by means of a head or cap fitting within the orifice to be closed, and countersunk, so as to be deep enough to permit the use of an external mandrel to resist the tool by which the seam is formed, and provided with a flange, which rests upon the upright edges of the can around the orifice, the flange being formed, with said edges, into a lap-seam, upon the external mandrel, as a support, thus obviating the necessity of placing a mandrel within the vessel, and affording a means of seaming the final head or cap in the can.

Secondly, in spreading or expanding the lap-seam thus formed by the union of the edges of the can with the flange of the countersunk head or cap, so that it shall be flaring, or shall stand at an angle to both the body and cap, thereby preventing the cap or head from falling off, or dropping from the can.

Thirdly, in combining the countersunk and flanged heads or caps with a can having corrugated or bulging sides, in such manner that the lap-seam formed by the union of the sides of the can with the flange of the countersunk head, as above specified, shall be within the compass of the bulging sides, whereby the seams will be protected from injury in case a number of cans is packed tightly, side by side, for transportation, or otherwise.

Fourthly, in forming a recess or depression in the body of the can, parallel with the lap-seam, and adjoining the edge of the turned-down flange of the countersunk head or cap, as and for the purposes hereinafter stated.

The head is stamped from a thin sheet of metal by a die of the shape shown in fig. 2, so as to form the shoulder *n* and flange *m*. This countersunk and flanged head is then placed over the orifice in the can, the flange of the head resting upon the edge of the sides, or upon a flange formed on the end of the sides. When the flange is formed upon the end of the sides, it is about one-half the width of the flange upon the head. The flange *m*, being bent down, as shown at A, is firmly pressed upon the flange of the sides of the can, as shown at B. The whole is then bent at an angle, as shown at C, in order that, at the next operation, it may be firmly pressed upon the sides of the can, as shown at D, the mandrel or other instrument being used on the exterior, against the shoulder *n*, during the operation.

By these means—that is, forming the heads with a shoulder and exterior flange upon them, and then sinking them into the orifice to be closed, so that a mandrel or other instrument can be used upon the exterior, for the purpose of forming a lap-seam between the flange of the sunk or recessed head and the upright edges of the can around the orifice—a water-tight can is produced, out of block or sheet-metal, at much less expense than formerly.

From the support given to the sides of the can by the shoulder *n*, the risk of breaking in transportation is avoided; and, in order to secure the seams from being injured when, for instance, a number of cans is placed closely together, side by side, the sides of the can are corrugated or made bulging, so that the lap-seams will be brought within the compass of the bulging sides; and thus, when the cans are packed together, their sides only will be in contact, while they rest and are supported upon their projecting seams, which are not in contact with each other.

Hitherto it has only been practicable to double-seam on one head, by inserting a mandrel or other suitable instrument within the vessel; but it has been impossible to double-seam the final head, because a mandrel or other instrument could not be inserted within the keg or can.

If desired, one head might be inserted, in the usual way, by means of a mandrel upon the interior.

It will be seen, that at the point in the sides of the can where the flanges *m* of the lap-seams terminate, there is a recess formed between the edge of the flange and the sides, either by the bulging of the sides, or by the bending or depression of the flange. This recess or depression forms a groove, which will retain the solder, if it be desired to further secure the lap-seam in such manner.

It will further be noticed that the formed seam is made flaring, so as to stand at an angle to the sides and head of the vessel. This flaring, spreading, or expanding of the seam is best effected during the operation of forming the seam against the mandrel.

In one head of the keg, shown in the drawings, a hole is struck by the die, in such a manner, that upon the upper side, an elevation is produced around the hole, as shown at E E. Upon the under side, a small plate, F F, having a corresponding opening, but smaller, is riveted to the head A. Cap G G fits upon the opening in the plate F F. After the keg is filled, this cap may be sealed upon the head.

What we claim as our invention, and desire to secure by Letters Patent, is—

1. The method of closing the ends of sheet-metal cans by means of a countersunk head or cap fitting within the orifice to be closed, and provided with a flange, which rests upon the upright edges of the can around the orifice, and is formed, with said edges, into a lap-seam, against an external mandrel, as a support, substantially as shown and set forth.

2. The flaring lap-seam, formed by the union of the flange of the countersunk head with the upright edges of the can surrounding the orifice to which said head is applied, substantially as and for the purposes shown and set forth.

3. A sheet-metal can, composed of flanged and countersunk heads, in combination with corrugated or bulging sides, the two being united by a lap-seam, formed as specified, and brought within the compass of the bulging sides, so that the seam or seams may be protected from injury, as herein set forth.

4. The formation of a groove or recess in the body of the can, parallel with the lap-seam, and adjoining the edge of the turned-down flange of the countersunk head or cap, as and for the purposes set forth.

5. A sheet-metal can, one or both ends of which are closed by means of a flanged and countersunk head or cap, applied and secured to the can in the manner substantially as shown and set forth.

In testimony whereof, we have hereunto set our hands, in the presence of two subscribing witnesses.

JAMES WILSON.
CHARLES GREEN.
WM. WILSON, JR.

Witnesses:
JOHN WOOD,
THOS. H. WILLIAMSON.